Nov. 13, 1962

J. A. DEVER ET AL 3,064,191

ELECTRICAL APPARATUS

Filed Jan. 16, 1959

INVENTORS.
JOHN A. DEVER
WILLIAM F. NEWBOLD
BY JOHN PARNELL
HARRY L. LATHAM JR.

ATTORNEY.

Nov. 13, 1962 J. A. DEVER ET AL 3,064,191
ELECTRICAL APPARATUS
Filed Jan. 16, 1959 2 Sheets-Sheet 2

INVENTORS.
JOHN A. DEVER
WILLIAM F. NEWBOLD
JOHN PARNELL
HARRY L. LATHAM JR.
BY
ATTORNEY

United States Patent Office 3,064,191
Patented Nov. 13, 1962

3,064,191
ELECTRICAL APPARATUS
John A. Dever, Gladyne, William F. Newbold, Philadelphia, John Parnell, Blue Bell, and Harry L. Latham, Jr., Philadelphia, Pa., assignors to Minneapolis-Honeywell Regulator Company, Minneapolis, Minn., a corporation of Delaware
Filed Jan. 16, 1959, Ser. No. 787,141
11 Claims. (Cl. 324—99)

The present invention relates to electrical measuring apparatus. More specifically, the present invention relates to an electrical measuring apparatus which operates on the principle of comparison encoding.

An object of the present invention is to provide a new and improved comparison encoding measuring apparatus.

Another object of the present invention is to provide a new and improved electrical measuring apparatus for obtaining a digital representation of the magnitude of a measured quantity.

Still another object of the present invention is to provide an improved electro-mechanical signal generator for a comparison encoding measuring device which signal generator is characterized by simplicity of construction.

A further object of the present invention is to provide an improved electrical measuring apparatus, as set forth herein, which is characterized by simplicity of operation and construction.

In accomplishing these and other objects, there has been provided in accordance with the present invention, a comparison encoding electrical measuring device having a sequentially operated reference signal switching circuit. The sequential operation of the switching circuit produces a sequence of groups of reference signals having decimally related amplitudes. The reference signals are compared, by a decision amplifier, with an information input signal. The decision amplifier controls a retention of desired ones of each group of reference signals. The desired reference signals are held in an additive or subtractive relationship with respect to alternate groups of reference signals to develop a composite reference signal having an amplitude equal to the input signal. An output device responsive to the presence of the aforesaid retained reference signals is used to indicate the decimal value of the input signal.

A better understanding of the present invention may be had from the following detailed description when read in connection with the accompanying drawings, in which.

Figure 1:
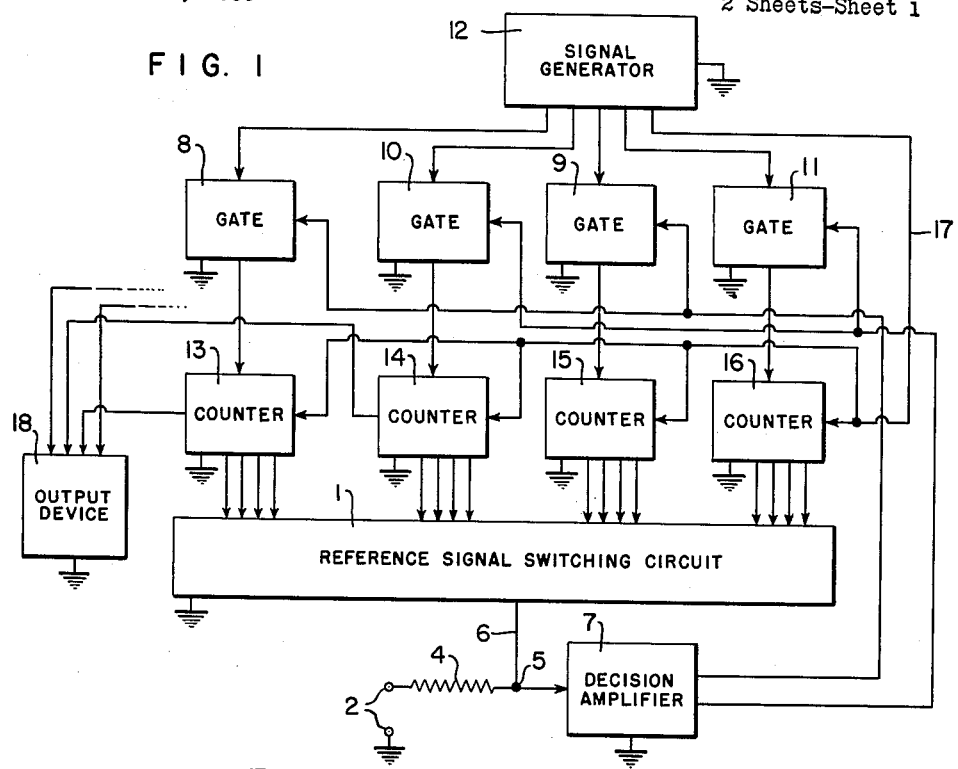
FIG. 1 is a schematic representation of a comparison encoding measuring device embodying the present invention.
Figure 2:
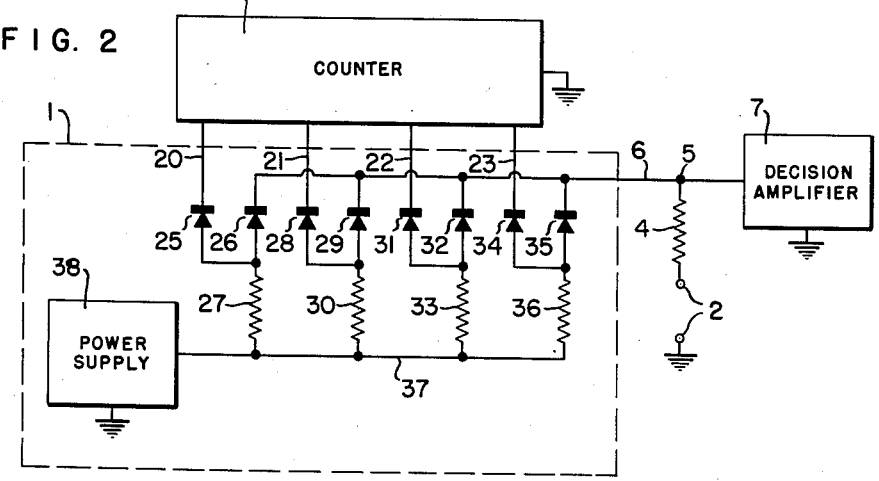
FIG. 2 is a schematic representation of a segment of a reference signal switching circuit for use with the measuring device shown in FIG. 1.

Referring to FIG. 1 in more detail, there is shown a comparison encoding measuring device with a reference signal switching circuit 1. A suitable switching circuit 1 is shown in FIG. 2 and described in detail hereinafter.

Figure 3:
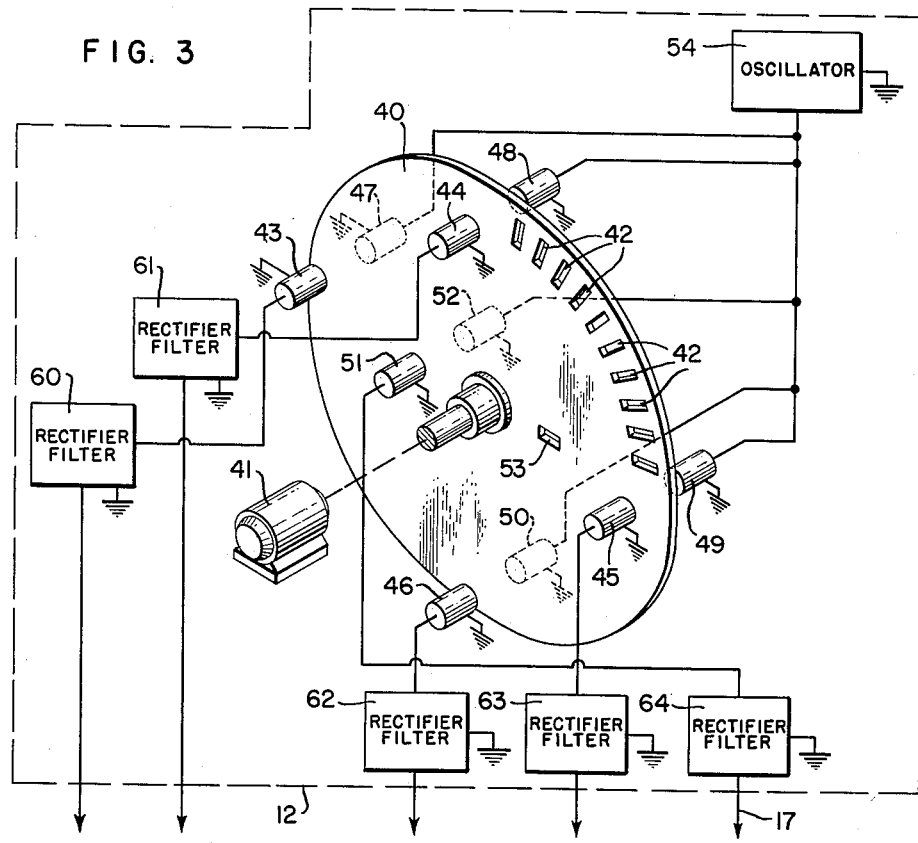
FIG. 3 is a pictorial representation of a signal generator for use with measuring device shown in FIG. 1.
Figure 4:
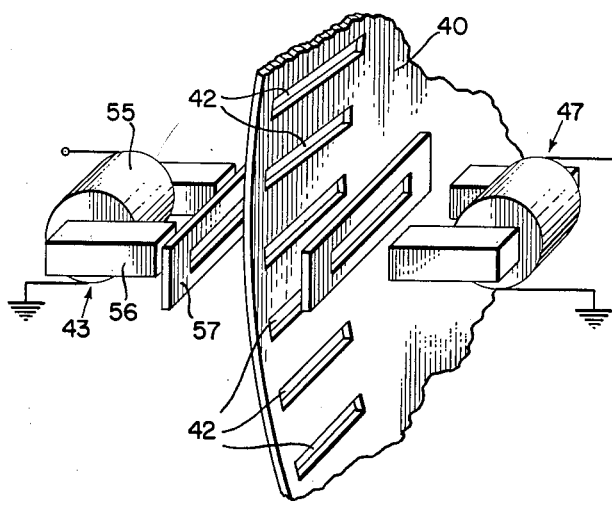
FIG. 4 is an exploded representation of one signal generating element for the signal generator shown in FIG. 3.
Figure 5:
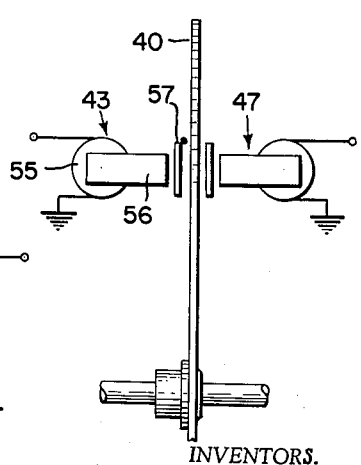
FIG. 5 is an assembled side view of the signal generating element shown in FIG. 4.

A pair of input terminals 2 are provided for connection to a source of unidirectional input signals. The input signals may be representations of temperature, flow, pressure or any other variable capable of being sensed by a monitoring device. The input signal is fed through an input resistor 4 to a signal summing point 5. A unidirectional reference signal from the switching circuit 1 is fed along a reference signal line 6 to the signal summing point 5 in an opposing relationship with respect to the input signal. The net unidirectional signal resulting from this opposing relationship is applied as a control signal to a decision amplifier 7. The decision amplifier 7 may be any one of many electrical devices used to produce two mutually exclusive output signals, each of the output signals corresponding to a different polarity of the control signal; such devices being well-known in the art. The two output signals from the decision amplifier 7 are used separately to control corresponding signal gating circuits. Thus, one polarity of the control signal; e.g., positive, is effective to produce an output signal from the amplifier 7 to control a first signal gate 8 and a third signal gate 9. The negative polarity of the control signal is effective to produce an output signal to control a second signal gate 10 and a fourth signal gate 11. The signal gates 8, 9, 10 and 11 are used to control the application of energizing signals from a signal generator 12. A suitable signal generator is shown in FIGS. 3, 4, and 5 and described in detail hereinafter. The energizing signals from the signal generator 12 are selectively fed to a plurality of electrical signal counters 13, 14, 15, 16 through corresponding ones of the aforesaid gating circuits. Thus, the first gate circuit 8 controls energizing signals to a first counter 13; a second gate circuit 10 controls a second counter 14; etc.

A reset signal from the signal generator 12 is fed along a reset line 17 to the counters 13, 14, 15 and 16 at the end of an encoding cycle.

An output device 18 is connected to the signal counters 13, 14, 15 and 16 to sense the operation thereof and thereby to provide an indication of the digital value of the input signal. The output device may be any suitable one of many electrical devices used to indicate the condition of an electrical signal counter. An example of suitable device is a lamp bank energized by the signal counter.

The mode of operation of the apparatus of the present invention follows:

Assume the signal counters 13, 14, 15 and 16 are initially in a reset or in a zero count state, and a positive polarity input signal is applied to the input terminals 2. Since the reference signal at the summing point 5 initially has a zero amplitude, a positive polarity control signal, corresponding to the input signal, is applied to the decision amplifier 7. The positive control signal produces a corresponding amplifier output signal. As previously mentioned, a positive control signal produces an amplifier output signal to control the first and the third signal gates 8 and 9. Further, this output signal is arranged to open the aforesaid gates; i.e., to allow signals from the signal generator 12 to pass through the signal gates to the associated counters. However, the signal generator 12 is arranged to produce a series of groups of sequential signals with each group of signals appearing on a separate one of a plurality of signal generator output lines. Therefore, the initial group of sequential signals is applied to the first gate 8 and the first counter 13, and there are no signals applied to the open third gate 9 to be supplied to the third counter 15.

The signal counters 13, 14, 15 and 16 are arranged to count the corresponding sequential group signals and to energize reference signal control lines to control the switching circuit 1. The signal counters, in a decimal system may count the ten sequential signals in each group of signals with a so-called decimally-coded binary counting system. Thus, assuming each counter has four counting stages, the first stage has a decimal value of one; the second, two; the third, four; and the fourth, eight. A count of six sequential signals would be represented by the energization of the second and the third counter stages, since the combined decimal value of these stages is six. The reference signal control lines from the counter stages control corresponding elements in the reference signal switching circuit 1 to produce corresponding decimally-coded reference signals. Each counter, consequently, controls a group of sequential reference signals having decimally-related amplitudes. For example, the first counter 13 may control a group of sequential reference signals representative of a thousand's decimal group; i.e., "1000," "2000," "3000," etc. A second counter 14 may control reference signals in a hundred's group; i.e., "100," "200," etc. A third counter 15 controls signals in a ten's group; and a fourth counter 16, signals in a unit's group.

It will be understood that the aforesaid representative magnitudes of the decimal groups may be altered to produce other decimal groups having the same relative signal amplitudes. For example, the use of lower magnitudes for the decimal groups; e.g., "1, 0.1, and 0.01" has utility in the measurement of low-level input signal; e.g., thermocouple signals, etc.

The sequential reference signals from each group are applied to the signal summing point 5 in opposition to the input signal. Further, the groups of reference signals are arranged in an alternately additive and subtractive relationship with respect to each other.

The initial group of sequential reference signals supplied by the switching circuit 1 are representative of the thousand's group starting with the lowest amplitude signal thereof; i.e., "1000." The net or difference signal resulting from the combination of this initial reference signal and the input signal is applied as a control signal to the amplifier 7.

If the polarity of the control signal remains positive, the amplifier 7 retains the output signal to the first and third gates 8 and 9. The retention of the open condition of these gates by the amplifier output signal allows the first counter 13 to count additional sequential energizing signals from the signal generator 12 and thereby to effect the production of further sequential reference signals having progressively increasing amplitudes in the "1000's" group. If the polarity of the control signal becomes negative as a result of this combination, indicating a reference signal greater than the input signal, the amplifier 7 terminates the amplifier output signal to the first and third gates 8 and 9. Further, the negative control signal produces an amplifier output signal to open the second and fourth gates 10 and 11.

When the polarity of the control signal does reverse, the aforesaid transfer of the amplifier output signal from the first and third gates 8 and 9 to the second and fourth gates 10 and 11 is effected. The termination of the counting operation of the first counter 13 by the closing of the first gate 8 enables the signal generator 12 to produce the remaining sequential signals in the first group of signals without affecting the retained count of the first counter 13. The retention of the count of the first counter 13 is effective to retain at the summing point 5 the last supplied reference signal from the switching circuit 1 in the "1000's" group.

The further operation of the signal generator 12 is effective to produce a second group of sequential energizing signals fed along another generator output line to the second gate 10. The open condition of the second gate 10 allows the second group of seqeuntial signals to operate the second counter 14. The second counter 14 controls the production of sequential reference signals by the switching circuit 1 in the next or "100's" decimal group starting with the lowest group signal; i.e. "100."

However, the sequential reference signals from the "100's" group are arranged to subtract from the retained reference signal of the first group. Thus, the composite reference signal representing the operation of the switching circuit 1 in the "100's" group is the difference between the retained first group reference signal and the applied sequential reference signals of the "100's."

As in the case of the first group of sequential reference signals, the counter controlled switching circuit 1 produces sequential reference signals, having progressively increasing amplitudes, in the second group until the polarity of the control signal for the amplifier 7 reverses. This reversal of polarity, however, indicates that the amplitude of the composite reference signal is lower than the amplitude of the input signal. The polarity reversal of the control signal effects a transfer of the amplifier 7 output signal from the second gate 10 to the third gate 9. This transfer of the output signal of the amplifier 7 closes the second gate 10 and terminates the counting operation of the second counter 14 with a retention of the count thereof. The retained count of the second counter 14 is effective to retain at the summing point 5 the last supplied reference signal from the switching circuit 1 in the "100's" group. The composite reference signal appearing at the summing point 5 is the difference between the retained first group reference signal and the retained second group signal.

The further operation of the signal generator 12 produces the remaining ineffective sequential energizing signals in the second group and, subsequently, a third group of sequential energizing signals fed along a third generator output line to the third gate 9. The sequential energizing signals fed through the third gate 9 to the third counter 15 control the production of sequential reference signals in a third or "10's" group which reference signals are arranged to add to the composite reference signal appearing at the summing point 5. As in the case of the first and second groups of reference signals, the counter controlled switching circuit 1 produces sequential reference signals, having progressively increasing amplitudes, in the third group starting with the lowest amplitude thereof. The sequential reference signals in the third group are produced until the polarity of the control signal again reverses. This polarity reversal effects the closing of the third gate 9 and the opening of the fourth gate 11. Upon the termination of the operation thereof, the third counter 15 retains the last count therein to produce a composite reference signal consisting of the retained reference signals of the first, second, and third groups in their aforesaid additive or subtractive relationships; i.e., the first group signal minus the second group signal plus the third group signal.

The further or fourth group operation of the signal generator 12 is similar to the aforementioned second group operation with the exception that the subtractive fourth group reference signals are controlled by the fourth counter 16. The fourth group of sequential reference signals are arranged in a unit's group starting with the lowest amplitude thereof; i.e., "1." The fourth group sequential reference signals are produced until the polarity of the control signal changes, and the fourth gate 11 is closed. The fourth counter 16 retains the fourth group count to produce a final composite reference signal at the summing point 5 consisting of the retained reference signals of the first, second, third and fourth groups in their aforesaid respective relationships.

The output device 18 is arranged to sense the retained counts in the signal counters 13, 14, 15 and 16 and to translate the retained counts into a decimal representation of the value of the input signal. In the case of a lampbank type output device, the decimal representation may be an illumination of the appropriately numbered lamps.

At the conclusion of the operation in the units group, the signal generator 12 is arranged to produce a reset signal fed along a reset line 17 to reset the counters 13, 14, 15 and 16 to an initial condition. The resetting of the counters is effective to remove the retained reference signals from the summing point 5 in preparation for a new encoding cycle.

The operation of the present invention may be illustrated by the following numerical example. In this example, the input signal is assumed to have an amplitude of "7863" volts. The production of the first group of sequential reference signals is terminated at a reference signal appearing at the summing point 5 of "8000" volts. The "8000" volt signal is retained by the switching circuit 1 and the sequential reference signals of the second group are subtracted therefrom. The subtraction operation of the second group of signals is terminated at a reference signal of "200" volts to produce a composite reference signal "7800" volts.

The third group of reference signals is terminated at an additive reference signal of "70" volts to produce a composite reference signal at the summing point 5 of "7870" volts.

The fourth group of reference signals is terminated at a subtractive step of "8" volts. The resulting composite reference signal of "7862" volts is translated by the output device 18 into a decimal representation of "7863" corresponding to the "7863" volt input signal.

In FIG. 2, there is shown a segment of a suitable reference signal switching circuit for use with the apparatus shown in FIG. 1.

The signal counters as previously discussed, each have a decimally-coded binary arrangement of a plurality of output lines. For example, assuming the first counter 13 has four counting stages, a first output line 20 has a coded weight of one. A second counter output line 21 has a coded weight of two. The third output line 22 and the fourth output line 23 have coded weights of four and eight, respectively. Thus, a count of seven sequential signals supplied to the counter 13 from the signal generator 12 is effective to produce an output signal on the first, second, and third output lines 20, 21, and 22 having a total coded weight of seven.

The counter output lines are used to supply switching signals to the reference signal switching circuit 1. This switching circuit 1 comprises a plurality of diode gates each connected to corresponding ones of the counter output lines. Each of the diodes gates includes a pair of diodes and a signal determining resistor. Thus, a first diode gate comprises a first bypass diode 25, a first reference signal diode 26 and a first resistor 27. A second diode gate includes a second by-pass diode 28, a second reference signal diode 29 and a second resistor 30. A third bypass diode 31, a third signal diode 32, a third resistor 33 and a fourth bypass diode 34, a fourth bypass diode 34, a fourth signal diode 35, a fourth resistor 36 comprise the third and the fourth diode gates, respectively.

The anodes of each pair of diodes are both connected to a common junction with one end of the respective diode gate resistor. The other ends of the gate resistors are connected to a common supply line 37 fed by a power supply 38. The cathodes of all the reference diodes are connected to the reference signal line 6. The cathodes of the bypass diodes are each connected to the associated stages of the signal counter 13.

The counter stages are arranged to control, in accordance with a sequential signal counting operation, the conduction of their associated bypass diodes depending on whether or not the counter stage is energized. If the counter stage is not energized, the counter output signal is effective to bias the corresponding bypass diode into conduction. A signal from the power supply 38 through the gate resistor is thereby diverted by the conducting bypass diode from the reference signal line 6 to the controlling counter stage. Conversely, the energizing of a counter stage, during a counting operation, produces a counter output signal to bias the corresponding bypass diode into non-conduction. The non-conducting bypass diode permits the signal from the power supply 38 to be applied through the associated signal diode to the reference signal line 6.

The resistors of the diode gates are arranged to pass a signal from the power supply 38 to the reference signal line 6 having an amplitude corresponding to the coded weight of the controlling counter stage. The values of the gate resistors are arranged in submultiples of a basic or unit value; e.g., the first resistor 27 may have a value "400K" ohms; the second resistor 30, a value of "200K" ohms; the third 33, "100K" ohms; the fourth 36, "50K" ohms. The signals passed by these gate resistors are inversely proportional to the resistance values and, consequently, have relative weighted values of "1," "2," "4," and "8" respectively.

It may be seen that additional groups of counter stages and corresponding switching circuits may control sequential reference signals having weighted values in different decimal groups. Assuming the above-mentioned resistance values are used in the "1000's" decimal group, the "100's" decimal group would be produced by gate resistors having resistance values of "40K," "20K," "10K," and "5K." Further, the additive and subtractive relationships of the decimal groups, as previously discussed, are determined by the polarity of the signal from the corresponding power supply 38. Thus, the polarity of the power supply line 37 for the additive reference signals may be positive, and the polarity for the subtractive reference signals may be negative.

The retention of the count of the counter is effective to retain the energized and non-energized conditions of the corresponding bypass diodes and, consequently, to retain the last applied reference signal in the corresponding decimal group. The reset of the counters to a zero count is effective to bias all the bypass diodes into a conducting state to remove the reference signals from the reference signal line 6.

In FIGS. 3, 4, and 5 there is illustrated a suitable signal generator for use with the apparatus shown in FIG. 1. A disc of non-magnetic electrically conductive material 40 is continuously rotated by a motor 41. Arranged along the periphery of the disc 40 is a group of radial slots 42. In a decimal encoding system, the number of radial slots is ten. Also arranged in close association with the periphery of the disc 40 are four magnetic transducers, 43, 44, 45, and 46 and four magnetic field producers 47, 48, 49, and 50. The four transducers are positioned on one side of the disc 40 with the corresponding field producers arranged in magnetic association on the other side of the disc 40. Thus, a first transducer 43 is positioned in magnetic association with a first field producer 47, etc. The pairs of transducers and corresponding field producers are spaced apart along the periphery of the disc 40 by a distance equal to the peripheral distance occupied by ten radial slots 42 plus a distance equal to two or three of the radial slots 42. The separation between a fourth transducer 46 and field producer 50 and the first transducer 43 and field producer 47 is further lengthened by an additional space equal to the distance of several radial slots. Within this additional space, a reset transducer 51 and an associated field producer 52 are positioned on a lower radial level than the other transducers and field producers. A reset slot 53 is provided in the disc 40 on the same radial level as the reset transducer and field producer. The reset slot 53 is positioned on the disc 40 ahead of the ten radial slots 42 in the direction of disc rotation by a distance approximately equal to the spacing of the reset transducer pair from the first transducer pair. Thus, the reset slot 53 passes between the reset transducer pair before the group of 10 radial slots 42 reaches the first transducer pair.

It may be seen that additional radial slots and/or transducers and field producers may be provided in the disc 40 in a manner similar to that described above.

An oscillator 54 is used to supply an alternative current energizing signal to all five of the field producers. The field producers convert the alternating magnetic field and apply this magnetic field to their respective magnetic transducers to create an alternating current transducer output signal in a manner hereinafter described.

Referring to FIGS. 4 and 5, there are shown detailed representations of the transducer pairs. As a representative transducer pair, the first transducer 43 and the first field producer 47 are shown. The first transducer 43 comprises a solenoid 55 mounted on a suitable magnetic structure 56 with a shield of non-magnetic electrically conductive material 57, having a magnetic field defining slit therein, positioned between the magnetic structure 56 and the disc 40. The first field producer 47 comprises a similar structure mounted on the opposite side of the disc 40 with the respective field defining slits arranged in alignment.

It may be seen from FIGS. 4 and 5 that the rotation of the disc 40 successively brings the disc slots into alignment with the previously aligned field defining slits. Since the disc 40 and the shields are constructed of non-magnetic electrically conductive, material; e.g., aluminum, the magnetic fields from the field producers are prevented from affecting the magnetic transducers, except when the disc slots and shield slits are in the aforementioned alignment. When the disc slots and the field defining slits are in alignment, an inductive or magnetic coupling is established which is effective to transmit a signal from the field producer to the transducer. Thus, the first, second, third, and fourth transducer pairs each produce a group of a succession of alternating current transducer output signals having the number thereof equal to the number of radial slots 42. The reset transducer pair produces one alternating current reset signal for each passage of the reset slot 53 therebetween. The alternating current output signals and the alternating reset signal are coupled to corresponding rectifiers and filters 60, 61, 62, 63 and 64. The separate output signals from the rectifiers and filters are used as the output signals and the reset signal from the signal generator 12 in a manner as previously discussed in relation to FIG. 1.

Other comparison encoding measuring devices are shown and claimed in the copending application of Wallace E. Belcher, Serial No. 787,143.

Subject matter shown but not claimed herein is shown and claimed in copending application Serial No. 99,005 of John A. Dever et al. filed on February 23, 1961.

Thus, it may be seen that there has been provided in accordance with the present invention a comparison encoding measuring, utilizing an electro-mechanical signal generator, for obtaining a digital representation of the magnitude of a measured quantity.

What is claimed is:

1. A comparison encoding measuring apparatus comprising a reference signal switching device including means for automatically producing decimally related groups of reference signals in response to bias signals applied thereto, said groups of reference signals having alternate polarities with respect to each other, a plurality of gating circuits, a source of sequential energizing signals, said gating circuits connecting said source to said switching device to produce said bias signals, means for comparing said groups of reference signals with an input signal representative of a measured variable to produce a difference control signal, a sensing means responsive to the difference control signal to control said gating circuits, and an output means responsive to said switching device to indicate a decimal value corresponding to the amplitude of said input signal.

2. A comparison encoding measuring device comprising a reference signal switching circuit responsive to bias signals applied thereto, a plurality of sequencing means for applying bias signals to said switching circuit to produce decimally related sequential groups of reference signals, said sequential groups of reference signals having alternate polarities with respect to each other, a plurality of gating circuits, a source of sequential energizing signals, said gating circuits connecting said source to respective ones of said sequencing means, a means for comparing said groups of reference signals with an input signal representative of a measured variable to produce a difference control signal, a sensing means responsive to the difference control signal to control said gating circuits, and an output means responsive to said sequencing means to indicate a decimal value corresponding to the amplitude of the input signal.

3. A comparison encoding measuring apparatus comprising a reference signal switching device including means for automatically producing decimally related groups of reference signals, said groups of reference signals having alternate polarities with respect to each other, said means including a plurality of electrical counters, each of said counters having at least one counting stage, a plurality of gating circuits, a source of sequential energizing signals, said gating circuits connecting said source to said counters, means for comparing said groups of reference signals with an input signal representative of a measured variable to produce a difference control signal, a sensing means responsive to the difference control signal to control said gating circuits, and an output means responsive to said switching device to indicate a decimal value corresponding to the amplitude of said input signal.

4. A comparison encoding measuring device comprising a reference signal switching device including means for automatically producing decimally related groups of reference signals, said groups of reference signals having alternate polarities with respect to each other, said means including a plurality of electrical counters, each of said counters having at least one counting stage, and a plurality of diode switching circuits, each of said diode switching circuits connected to a corresponding one of said counter stages, a plurality of gating circuits, a source of sequential energizing signals, said gating circuits connecting said source to said counters, means for comparing said groups of reference signals with an input signal representative of a measured variable to produce a difference control signal, a sensing means responsive to the difference control signal to control said gating circuits, and an output means responsive to said switching device to indicate a decimal value corresponding to the amplitude of said input signal.

5. A comparison encoding measuring apparatus comprising a reference signal switching device including means for automatically producing decimally related groups of reference signals, said groups of reference signals having alternate polarities with respect to each other, a plurality of gating circuits, a source of sequential energizing signals, said source comprising magnetic field producing means, magnetic field transducer means responsive to the magnetic field from said producing means and arranged in alignment with said producing means, said producing means and said transducer means having similar magnetic structures, a disc of non-magnetic electrically conductive material rotatably positioned between said producing means and said transducer means, said disc having radial slots therein arranged to pass between said producing means and said transducer means upon rotation of said disc, a first magnetic field defining means positioned between said disc and said producing means, a second magnetic field defining means positioned between said disc and said transducer means, said first and said second defining means each comprising a sheet of non-magnetic electrically conrductive material with a slit therein, said first and said second defining means having the slits in mutual alignment, and a means for energizing said producing means, said gating circuits connecting said source to said switching device, means for comparing said groups of reference signals with an input signal representative of a measured variable to produce a difference control signal, a sensing means responsive to the difference control signal to conttrol said gating circuits, and an output means responsive to said switching device to indicate a decimal value corresponding to the amplitude of said input signal.

6. A comparison encoding measuring apparatus comprising a reference signal switching circuit, a plurality of sequencing means for said switching circuit to produce decimally related sequential groups of reference signals, said sequential groups of reference signals having alternate polarities with respect to each other, a plurality of gating circuits, a source of sequential energizing signals, said source comprising magnetic field producing means, magnetic field transducer means responsive to the magnetic field from said producing means and arranged in alignment with said producing means, said producing means and said transducer means having similar magnetic structures, a disc of non-magnetic electrically conductive material rotatably positioned between said producing means and said transducer means, said disc having radial slots therein arranged to pass between said producing means and said transducer means upon rotation of said disc, a first magnetic field defining means positioned between said disc and said producing means, a second magnetic field defining means positioned between said disc and said transducer means, said first and said second defining means each comprising a sheet of non-magnetic electrically conductive material with a slit therein, said first and said second defining means having the slits in mutual alignment, and a means for energizing said producing means, said gating circuits connecting said source to respective ones of said sequencing means, a means for comparing said groups of reference signals with an input signal representative of a measured variable to produce a difference control signals, a sensing means responsive to the difference control signal to control said gating circuits, and an output means responsive to said sequencing means to indicate a decimal value corresponding to the amplitude of the input signal.

7. A comparison encoding measuring device comprising a reference signal switching circuit, a plurality of sequencing means for said switching circuit comprising a plurality of electrical counters, each of said counters having at least one counting stage, said sequencing means controlling said switching circuit to produce decimally related sequential groups of reference signals, said sequential groups of reference signals having alternate polarities with respect to each other, a plurality of gating circuits, a source of sequential energizing signals, said gating circuits connecting said source to respective ones of said sequencing means, a means for comparing said groups of reference signals with an input signal representative of a measured variable to produce a difference control signal to control said gating circuits, and an output means responsive to said sequencing means to indicate a decimal value corresponding to the amplitude of the input signal.

8. A comparison encoding measuring device comprising a reference signal switching circuit, said switching circuit including a plurality of bypass diodes, a plurality of signal diodes and a power supply having a plurality of energizing signal output lines, said bypass diodes and said signal diodes being arranged in pairs comprising one of said bypass diodes and one of said signal diodes, the cathodes of said signal diodes being connected to a common output signal line of said switching circuit and the cathodes of each of said pairs being connected to a corresponding one of the energizing signal output lines of said power supply, a plurality of sequencing means for said switching circuit comprising a plurality of electrical counters, each of said counters having at least one counting stage, the cathodes of each of said bypass diodes being connected to a corresponding one of the counting stages of said electrical counters, said sequencing means controlling said switching circuit to produce decimally related sequential groups of reference signals, said sequential groups of reference signals having alternate polarities with respect to each other, a plurality of gating circuits, a source of sequential energizing signals, said gating circuits connecting said source to respective ones of said sequencing means, a means for comparing said groups of reference signals with an input signal representative of a measured variable to produce a difference control signal to control said gating circuits, and an output means responsive to said sequencing means to indicate a decimal value corresponding to the amplitude of the input signal.

9. A reference signal switching device comprising a reference signal switching circuit, said switching circuit including a plurality of bypass diodes, a plurality of signal diodes and a power supply having a plurality of energizing signal output lines, said bypass diodes and said signal diodes being arranged in pairs comprising one of said bypass diodes and one of said signal diodes, the cathodes of said signal diodes being connected to a common output signal line of said switching circuit and the cathodes of each of said pairs being connected to a corresponding one of the energizing signal output lines of said power supply, a plurality of sequencing means for said switching circuit comprising a plurality of electrical counters, each of said counters having at least one counting stage, the cathodes of each of said bypass diodes being connected to a corresponding one of the counting stages of said electrical counters, said sequencing means controlling said switching circuit to produce decimally related sequential groups of reference signals.

10. A comparison encoding measuring device comprising a reference signal switching circuit, a plurality of sequencing means for said switching circuit comprising a plurality of electrical counters, each of said counters having at least one counting stage, said sequencing means controlling said switching circuit to produce decimally related sequential groups of reference signals, said sequential groups of reference signals having alternate polarities with respect to each other, a plurality of gating circuits, a source of sequential energizing signals, said source comprising magnetic field producing means, magnetic field transducer means responsive to the magnetic field from said producing means and arranged in alignment with said producing means, said producing means and said transducer means having similar magnetic structures, a disc of non-magnetic electrically conductive material rotatably positioned between said producing means and said transducer means, said disc having radial slots therein arranged to pass between said producing means and said transducer means upon rotation of said disc, a first magnetic field defining means positioned between said disc and said producing means, a second magnetic field defining means positioned between said disc and said transducer means, said first and second defining means each comprising a sheet of non-magnetic electrically conductive material with a slit therein, said first and said second defining means having the slits in mutual alignment, and a means for energizing said producing means, said gating circuits connecting said source to respective ones of said sequencing means, a means for comparing said groups of reference signals with an input signal representative of a measured variable to produce a difference control signals, a sensing means responsive to the difference control signal to control said gating circuits, and an output means responsive to said sequencing means to indicate a decimal value corresponding to the amplitude of the input signal.

11. A comparison encoding measuring apparatus comprising a reference signal switching circuit, said switching circuit including a plurality of bypass diodes, a plurality of signal diodes and a power supply having a plurality of energizing signal output lines, said bypass diodes and said signal diodes being arranged in pairs comprising one of said bypass diodes and one of said signal diodes, the cathodes of said signal diodes being connected to a common output signal line of said switching circuit and the cathodes of each of said pairs being connected to a corresponding one of the energizing signal output lines of said power supply, a plurality of sequencing means for said switching circuit comprising a plurality of electrical counters, each of said counters having at least one counting stage, the cathodes of each of said bypass diodes being connected to a corresponding one of the counting stages of said electrical counters, said sequencing means controlling said switching circuit to produce decimally related sequential groups of reference signals, said sequential groups of reference signals having alternate polarities with respect to each other, a plurality of gating circuits, a source of sequential energizing signals, said source comprising magnetic field producing means, magnetic field transducer means responsive to the magnetic field from said producing means and arranged in alignment with said producing means, said producing means and said transducer means having similar magnetic structures, a disc of non-magnetic electrically non-conductive material rotatably positioned between said producing means and said transducer means, said disc having radial slots therein arranged to pass between said producing means and said transducer means upon rotation of said disc, a first magnetic field defining means positioned between said disc and said producing means, a second magnetic field defining means positioned between said disc and said transducer means, said first and said second defining means each comprising a sheet of non-magnetic electrically non-conductive material with a slit therein, said first and said second defining means having the slits in mutual alignment, and a means for energizing said producing means, said gating circuits connecting said source to respective ones of said sequencing means, a means for comparing said groups of reference signals with an input signal representative of a measured variable to produce a difference control signal, a sensing means responsive to the difference control signal to control said gating circuits, and an output means responsive to said sequencing means to indicate a decimal value corresponding to the amplitude of the input signal.

References Cited in the file of this patent

UNITED STATES PATENTS

| | | |
|---|---|---|
| 2,458,569 | Cummings | Jan. 11, 1949 |
| 2,550,816 | Jackson | May 1, 1951 |
| 2,553,292 | Barrett | May 15, 1951 |
| 2,662,213 | Vanderlyn | Dec. 8, 1953 |
| 2,836,356 | Forrest | May 27, 1958 |
| 2,896,198 | Bennett | July 21, 1959 |
| 2,940,071 | Kindred | June 7, 1960 |